United States Patent [19]

Scardovi et al.

[11] Patent Number: 4,689,641

[45] Date of Patent: Aug. 25, 1987

[54] INK JET PRINTING HEAD

[75] Inventors: Alessandro Scardovi, Ivrea; Adriano Fetta, Castellamonte, both of Italy

[73] Assignee: Ing. C. Olivetti & C., S.p.A., Ivrea, Italy

[21] Appl. No.: 902,709

[22] Filed: Sep. 2, 1986

[30] Foreign Application Priority Data

Sep. 17, 1985 [IT] Italy .............................. 67783 A/85

[51] Int. Cl.[4] ............................................ G01D 15/16
[52] U.S. Cl. ............................................ 346/140 R
[58] Field of Search ...................................... 346/140

[56] References Cited

U.S. PATENT DOCUMENTS 4,312,010 1/1982 Doring ................................ 346/140
4,364,066 12/1982 Koto .................................... 346/140
4,485,386 11/1984 Dagna ............................. 346/140 X

*Primary Examiner*—Joseph W. Hartary

*Attorney, Agent, or Firm*—Banner, Birch, McKie & Beckett

[57] ABSTRACT

One or more printing elements in tube form with a capillary nozzle at one end are mounted in aligned and mutually parallel relationship with a cavity in a support. The printing elements have piezoelectric sleeves thereon and are embedded in a filling of polymerised resin which fills the cavity. They are disposed in such a way that the nozzles project externally from the support while the other ends communicate with a common ink reservoir. The upper wall of the reservoir at each tube is arched with the highest region aligned with the corresponding tube in such a way that any bubbles in the ink can be easily expelled by way of the nozzles. A capillary filter separates the chamber of the reservoir from an ink feed conduit to prevent impurities or air bubbles from passing therethrough. In another embodiment, the reservoir is partitioned into a plurality of separate chambers to ensure that emptying of one tube does not affect operation of the adjacent tubes.

10 Claims, 15 Drawing Figures

INK JET PRINTING HEAD

BACKGROUND OF THE INVENTION

The present invention relates to a printing head comprising at least one tubular printing element having a capillary nozzle at one end and communicating at the other end directly with an ink reservoir, the printing element being associated with a piezoelectric transducer for varying the volume of the printing element, the printing element and transducer being disposed in a single block, e.g. being encapsulated in a block of resin in a cavity in a support.

In ink jet heads in which the ink reservoir is directly connected to the nozzles, the presence of bubbles of air in the reservoir represents a major disadvantage which adversely affects operation of the head.

A system has been proposed for removing the bubbles from the reservoir by means of a breather pipe which communicates with a suction pump. That construction is complicated and expensive since it requires an additional tube between the movable head and the vacuum pump which is mounted in a static position on the structure of the printer.

SUMMARY OF THE INVENTION

The object of the present invention is to provide an ink jet printing head in which any bubbles that may be present in the ink are automatically eliminated during operation of the head.

More particularly, it is an object of the invention to provide an ink jet printing head wherein the reservoir is closed at the top by a first arched wall at the level of the said other end of the printing element, so as to facilitate expulsion by way of the nozzle of any bubbles present in the reservoir.

BRIEF DESCRIPTION OF THE DRAWINGS

The invention will be described in more detail, by way of example, with reference to the accompanying drawings, in which.

DESCRIPTION OF THE PREFERRED EMBODIMENTS

Figure 1:
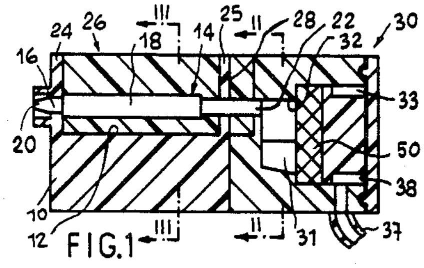
FIG. 1 is a view in longitudinal section of a multi-nozzle head embodying the invention.
Figure 2:
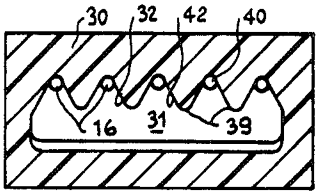
FIG. 2 is a view in section taken along line II—II in FIG. 1.

Referring to FIGS. 1 and 2, disposed in a cavity 10 in a block 12, hereinafter referred to as the base portion of the head, is a plurality of tubular ink jet printing elements 14; there are for example five such elements 14. Each element is formed in known manner by a tube 16 of glass or metal which is surrounded by a sleeve-type piezoelectric transducer 18.

Figure 3:
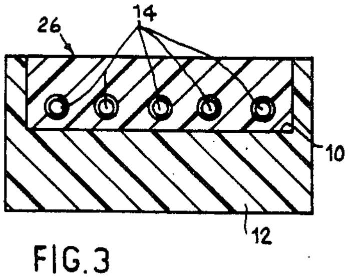
FIG. 3 is a view in cross-section taken along line III—III in FIG. 1 in a construction having a reservoir which is common to all the nozzles.

Each tube 16 terminates at one end with a nozzle 20 for discharge of drops of ink and is open at the other end 22. The elements 14 pass through two oppositely disposed walls 24 and 25 of the cavity 10 in such a way as to protect from the base portion 12. The cavity 10 is then filled by a polymerisable liquid resin in such a way that, after the resin has set, the arrangement forms a single block 26 (see FIG. 3) as between the element 14 and the base portion 12.

Figure 4:
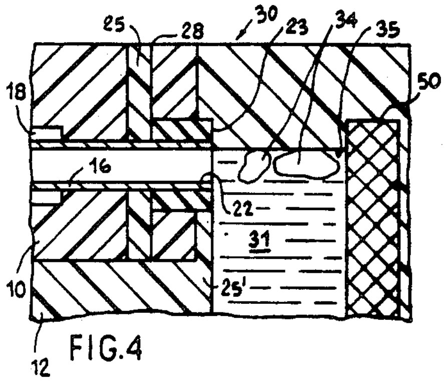
FIG. 4 shows a part of the FIG. 1 construction on an enlarged scale.

Fixed to the rear face 28 of the base portion 12 (see FIG. 1) from which the open ends 22 of the tubes 16 project, is a distributor 30 comprising a closed distribution chamber or reservoir 31 which is inteneded to contain the ink for feeding the printing elements 14, the ends 22 of which appear within the chamber 31. The end 22 of the tubes 16, in the part projecting from the base portion 12, is enclosed by a sleeve 23 (see FIG. 4) to facilitate insertion of that end into a corresponding hole in a wall 25' of the distributor 30.

In accordance with a first embodiment, in order to prevent bubbles 34 from stagnating within the reservoir 31, the upper wall 32 of the reservoir 31 is provided with arched or concave portions 35, each concave portion 35 being disposed at the location of a tube 16. The highest part of each concave portion 35 is aligned (see FIG. 4) with the internal cylindrical surface of the tubes 16 in such a way as to create a continuous surface as between the reservoir 31 and the interior of the tubes 16. In that way the wall 32 (see FIG. 2) assumes an undulating or corrugated configuration, with a succession of convex portions 39 alternating with concave portions 40, which are connected together by inclined surfaces 42. The inclined surfaces 42 promote collection of the bubbles in the high part of the wall 32 from which they can pass into the tubes 16 to be expelled through the nozzles 20 during operation of the head. Automatic expulsion of the bubbles therefore ensures continuous operation of the writing elements 14.

The distributor 30 (FIG. 1) contains a filter of flat shape, formed by a plate 50 of porous material with an equivalent porosity of around 20 μm, such as to impart to the filter a degree of capillarity which is around three times that of the nozzle 20 and a hydraulic resistance of about one tenth of that of the nozzle. Besides forming a barrier in regard to solid impurities entrained by the ink, the filter 50 has the property of stopping emptying out of the chamber 31, by the effect of the surface tensions due to the capillarity thereof, ensuring that such emptying is not propagated upstream of the filter.

Figure 5:
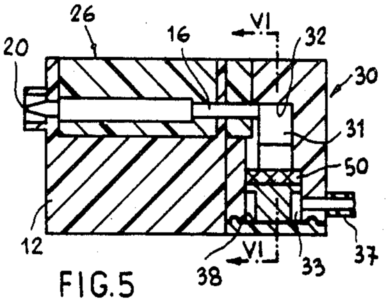
FIG. 5 is a view in longitudinal section of an alternative form of the head shown in FIG. 1.
Figure 10:
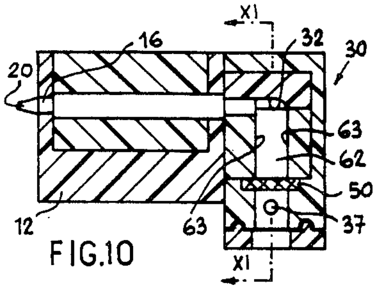
FIG. 10 is a view in longitudinal section of another alternative embodiment of the head shown in FIG. 5.

The filter may be disposed in the rearward part of the chamber 31, facing the ends 22 of the tubes 16 (see FIG. 1) or in the lower part of the chamber 31 (see FIGS. 5 and 10).

The filter 50 separates the chamber 31 from an ink collector space 33 for the ink which reaches same by way of a conduit 37 from a main reservoir (not shown). A wall of the space 33 is internally covered by a layer 38 of soft rubber for absorbing and neutralising excess pressures in the ink, which are caused by the rapid reversals of movement of the head when it is mounted on a carriage of a printer.

In order to ensure that the accidental emptying of one of the tubes 16 cannot affect operation of the adjacent tubes, the chamber 31 may be subdivided into separate cells, as shown in FIGS. 7, 8, 9 and 11.

Figure 7:
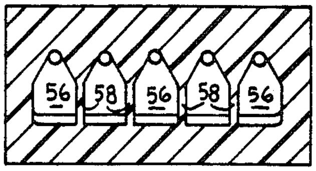
FIG. 7 is a view in cross-section taken along line VI—VI in FIG. 3, with a reservoir having separate cells.
Figure 8:
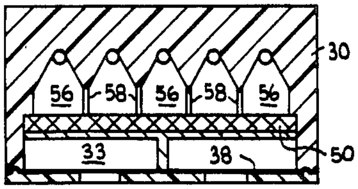
FIG. 8 is a view in cross-section similar to that shown in FIG. 6, having reservoir wiht separate cells.

FIGS. 7 and 8 show two heads of the type illustrated respectively in FIG. 1 and FIG. 5, wherein the chamber 31 is subdivided into cells 56 by divider baffles or partitions 58.

In both of the embodiments shown in FIGS. 7 and 8, the baffles 58 terminate against the filter 50 so that accidental emptying of a cell is interrupted by the filter 50 and is not extended to the adjacent cells.

Figure 9:
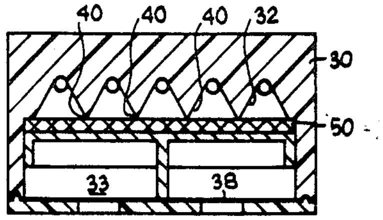
FIG. 9 is a view in cross-section similar to that shown in FIG. 6, with cells of a reduced volume.

In order to limit the amount of ink required for filling the cells 56, the volume of each cell 56 is reduced by eliminating the baffles between the cells, as illustrated in FIG. 9, and bringing the filter 50 into contact with convex portions 40 of the upper wall 32.

Figure 11:
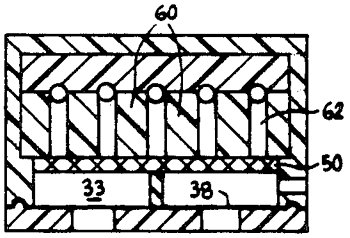
FIG. 11 is a view in cross-section taken along line XI—XI in FIG. 10, FIGS. 12 and 14 are views in longitudinal section of two further embodiments of the head according to the invention.

An alternative form of the above-described construction is illustrated in FIGS. 10 and 11. The sectors 60 (see FIG. 11) are increased in size to the reduce the width of the cells 62. The above mentioned width is equal to around the diameter of the tubes 16.

Figure 12:
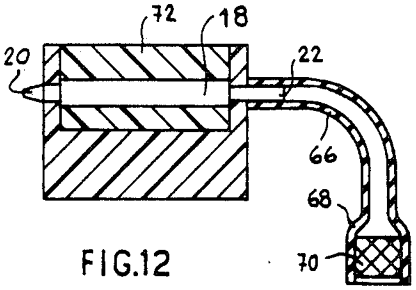
Figure 13:
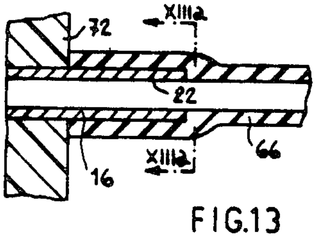
FIGS. 13 and 13*a* are a plan view of the head shown in FIG. 12.
Figure 13A:
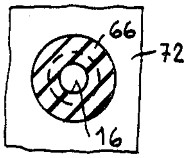
Figure 14:
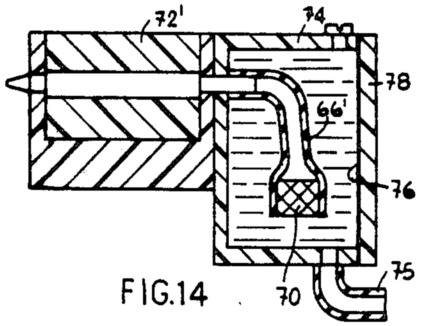

A further alternative form of the head shown in FIG. 1 is illustrated in FIGS. 12 and 13. In this case the distributor 30 shown in FIG. 1 is replaced by individual conduits 66 of soft rubber, which are curved downwardly, each being fitted onto the end 22 of each tube 16. The free end 68 of the conduit 66 is enlarged and contains a filtration capsule 70 of porous material with the same characteristics as the filter 50 in FIG. 1. Each element 14 is incorporated in its own block 72 and can be used individually for printing of serial type or in conjunction with other identical blocks to form printing heads of the series-parallel type. The conduits 66 are made of soft synthetic rubber which is impermeable with respect to gases and vapours, for example of the butyl-fluorinate type, with a Shore hardness of between 30 and 75 Sh-A. It is also possible to use silicone rubbers which are fairly permeable with respect to the vapours from the ink. In the latter case the head is designed as shown in FIG. 14 in which, to prevent evaporation of the ink contained in the conduits 66', they are contained within an auxiliary reservoir 74 which is fixed to the blocks 72' and which is kept full of ink by way of a feed conduit 75. Since the conduits 66' are permanently immersed in the ink in the auxiliary reservoir 74, any risk of the ink drying out within the conduits 61' due to evaporation is reliably eliminated. The auxiliary reservoir 74 is provided with a resilient diaphragm 76 which bears against a wall 78 to damp the increased pressures in the ink which are caused by the rapid reversals of movement of the head when it is mounted on a carriage of a printer.

The heads according to the invention as described hereinbefore are particularly suitable for being controlled by the control circuit described in our European patent application No. 86 305 013.4 entitled "Control circuit for an ink jet head".

In fact, the provision of the chamber 31 and the filter 50 (see FIG. 1) in direct communication with the open end 22 of the tube 16 provides that the tube 16 can be considered as a conduit which is hydraulically open at the end 22, whereby reflections of the pressure waves take place exclusively between the ends 20 and 22 of the tube 16.

Figure 6:
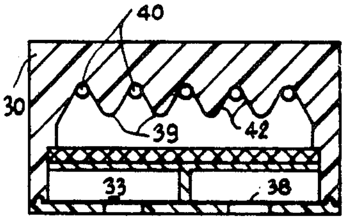
FIG. 6 is a view in cross-section taken along line VI—VI in FIG. 5.

Such conditions occur with chambers 31 (see FIGS. 3 and 6) or 56 (see FIGS. 7 and 8) of a volume is greater than around 15 $mm^3$; it is also possible to reduce the volume of the chambers 62 (FIG. 10) to a minimum of around 3 $mm^3$ by constructing the distributor 30 with walls 63 of soft silicone rubber with a Shore hardness of between 25 and 40 Sh-A.

The head shown in FIGS. 12 and 14 performs in a similar fashion whenever the internal volume of the conduit 66 (66') between the end 22 and the filter 70 is kept within the specified limits.

We claim:

1. An ink jet printing head comprising at least one tubular printing element having a capillary nozzle at one end and communicating at the other end directly with a reservoir for the ink, the printing element being associated with a piezoelectric transducer for varying the volume of the printing element, the printing element and transducer being disposed in a single block, characterised in that the reservoir is closed at the top by a first arched wall at the level of the said other end of the printing element, so as to facilitate expulsion by way of the nozzle of any bubbles present in the reservoir.

2. A printing head according to claim 1, wherein the reservoir comprises a second wall of porous material through which the ink passes by capillary action, the porous wall hydraulically separating the reservoir from a source for the supply of the ink.

3. A printing head according to claim 2, wherein the second wall is opposite the first arched wall.

4. A printing head according to claim 2, wherein the second wall is adjacent to the first arched wall and opposite to the said second end of the printing element.

5. A printing head according to claim 1, wherein the reservoir comprises a tubular conduit communicating at a first end with the printing element and having a second end a porous filter element hydraulically separating the tubular conduit from a source for supply of the ink.

6. A printing head according to claim 5, wherein the tubular conduit is of synthetic rubber which is impermeable with respect to gases and vapours, with a hardness of between 30 and 75 Shore-A.

7. A printing head according to claim 5, wherein the tubular conduit is of synthetic rubber which is permeable with respect to gases and vapours and is arranged in an ink-filled container fixed to the printing head.

8. A printing head according to claim 1, comprising a plurality of tubular printing elements wherein the reservoir comprises a plurality of divider baffles and a filter element of porous material co-operating with the baffles to divide the reservoir into a plurality of cells, each cell corresponding to a printing element, whereby a cell is hydraulically separated from the others and from a common source for the supply of ink.

9. A printing head according to claim 8, wherein each cell has a volume between 15 and 3 $mm^3$.

10. A printing head according to claim 8 or 9, wherein the cells are defined by walls of elastic material which is impermeable with respect to the ink and which is of a hardness of between 25 and 40 Shore-A.

* * * * *